United States Patent [19]
Gobeli

[11] 3,911,929
[45] Oct. 14, 1975

[54] DEMAND CARDIAC PACER

[75] Inventor: David H. Gobeli, St. Paul, Minn.

[73] Assignee: Medtronic, Inc., Minneapolis, Minn.

[22] Filed: May 20, 1974

[21] Appl. No.: 471,564

[52] U.S. Cl. .......................................... 128/419 PG
[51] Int. Cl.² ............................................ A61N 1/36
[58] Field of Search .......... 128/419 P, 419 PG, 421, 128/422

[56] References Cited
UNITED STATES PATENTS

| | | | |
|---|---|---|---|
| 3,677,251 | 7/1972 | Bowers | 128/419 PG |
| 3,678,937 | 7/1972 | Cole et al. | 128/419 PG |
| 3,688,776 | 9/1972 | Kenny | 128/419 PG |
| 3,759,266 | 9/1973 | Lee | 128/419 PG |

*Primary Examiner*—William E. Kamm
*Attorney, Agent, or Firm*—Lew Schwartz; Wayne A. Sivertson

[57] ABSTRACT

In a demand cardiac pacer including a resettable pulse generator and a sense amplifier adapted to be connected to the heart for generating a reset signal in response to a sensed heartbeat, the improved apparatus including a frequency detector for passing those reset signals whose interval is greater than a predetermined value and blocking those reset signals whose interval is less than the predetermined value. The frequency detector includes a timing circuit for establishing a predetermined period of time following each reset signal and circuitry for blocking all reset signals subsequent to a time period establishing signal. In a preferred embodiment, the blocking circuitry consists of a transistor switch for shunting the reset signals during the predetermined period of time and a delay element for allowing the passage of an initial time period establishing signal.

10 Claims, 1 Drawing Figure

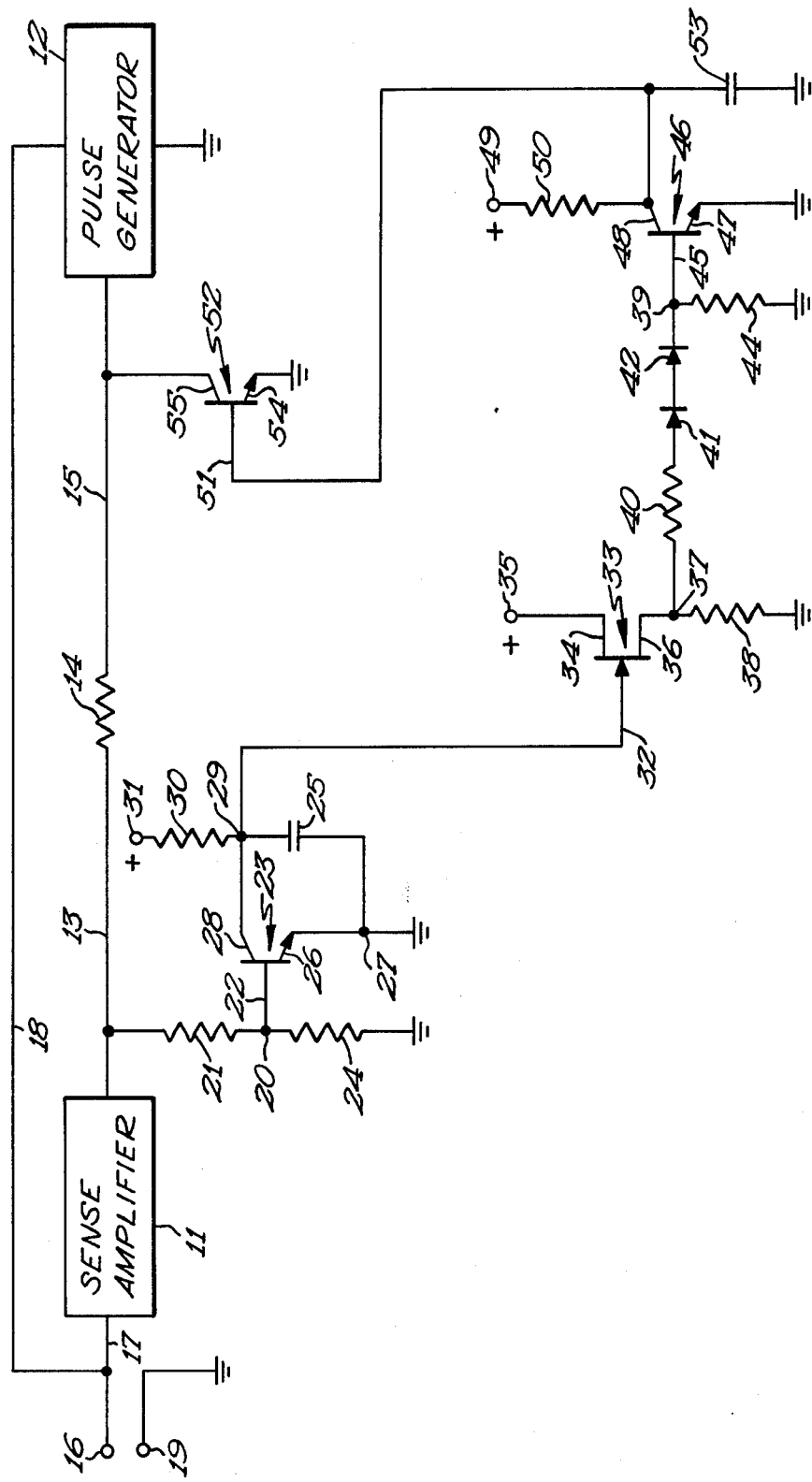

DEMAND CARDIAC PACER

BACKGROUND OF THE INVENTION

Demand cardiac pacers are well known to those familiar with the art. Such pacers provide a heart stimulating pulse to the patient's heart only in the absence of a natural heartbeat. If only a single natural heartbeat is absent, only a single stimulating pulse will be provided. If more than one natural heartbeat is missing, an equal number of stimulating pulses will be provided.

Typical demand cardiac pacers generate stimulating pulses at time intervals approximating the rate of natural heartbeats. Upon detection of a natural heartbeat, the next stimulating pulse which would otherwise be generated is inhibited. Upon the inhibiting of the stimulating pulse, the timing cycle of the pacer is restarted so that the next stimulating pulse will be generated (if needed) at approximately the same time as an expected natural heartbeat. The generation of a stimulating pulse restarts the timing cycle of the pacer so that no matter how many stimulating pulses are generated, they occur at essentially the same time spacing from each other and from the last natural heartbeat as would be the case if they were all heartbeats.

In practice, it has been found that other signals can inhibit the generation of a stimulating pulse just as a natural heartbeat. For example, strong electrical signals commonly encountered in the environment, such as stray 60 Hz energy, may result in the inhibiting of a stimulating pulse as if a natural heartbeat had been detected. Also, for reasons well known to those familiar with the art it is preferable to distinguish the QRS complex and the P and T waves for the purpose of detecting a natural heartbeat and inhibiting a stimulating pulse. To accomplish both of these purposes, it has been suggested in the prior art to provide a tuned circuit to distinguish between the QRS complex on the one hand and the undesired signals on the other. While the filtering attempts have proven successful with regard to some of the undesired signals, it is exceedingly difficult to provide a filter with sufficient discrimination so as to eliminate all of the undesired signals, the 60 Hz signals, for example.

SUMMARY OF THE PRESENT INVENTION

The present invention provides a demand cardiac pacer including a resettable pulse generator and sense amplifier adapted to be connected to the heart for generating a reset signal in response to a sensed heartbeat. A frequency detector passes those reset signals whose interval is greater than a predetermined value while blocking those reset signals whose interval is less than the predetermined value. The frequency detector includes a first means responsive to the reset signals for establishing a predetermined period of time following each reset signal and second means responsive to the first means and operative during the predetermined period of time for blocking all reset signals subsequent to a time period establishing signal. The predetermined period of time is established to effectively discriminate between the QRS complex and the undesired signals such as P and T waves and extraneous noise, including electromagnetic impulses. It has been found that a time period of approximately 400 milliseconds is effective for the purpose of the present invention.

Briefly, a natural heartbeat will be detected by the sense amplifier, most commonly in response to the R-wave of that heartbeat. The sense amplifier will generate a reset signal which will inhibit a pulse generator and restart its timing cycle. Concurrently, the frequency detector of the present invention will become operative and block subsequent reset signals for a time period of 400 milliseconds. Any reset signals appearing during the 400 millisecond time period will reset the frequency detector for another 400 millisecond period. A series of reset signals 400 milliseconds, or less, apart will cause the demand cardiac pacer to revert to an asynchronous pacing mode.

If no reset signals appear during the 400 millisecond period of time, a subsequent reset signal will be allowed to inhibit the next stimulating pulse and again start the 400 millisecond period of time. During this period of time, the frequency detector will block all subsequent reset signals. In this manner, the frequency detector of the present invention will allow the inhibiting of stimulating pulses through the detection of the desired QRS complex while preventing the inhibiting of the stimulating pulses upon the detection of undesired signals and extraneous noise, including electromagnetic impulses. Continuous signals, of any nature, having a rate greater than approximately 2.5 Hz will cause a continuous blocking of reset signals and the reversion of the pacer to an asynchronous pacing mode.

BRIEF DESCRIPTION OF THE DRAWING

The single FIGURE is a schematic of a preferred embodiment of the present invention.

DETAILED DESCRIPTION OF THE DRAWING

The single FIGURE shows a sense amplifier 11 and pulse generator 12. The sense amplifier 11 may be of the type well known to those familiar with the art for providing a generally square wave output in response to any pulsed input. The pulse generator 12 may also be of the type well known to those familiar with the art and include resettable timing circuitry, the timing circuit being reset by a reset signal from the sense amplifier 11 or the generation of an output pulse by the pulse generator 12. A reset signal from the sense amplifier 11 is applied to the pulse generator 12 by a line 13, resistance 14 and line 15. A common electrode 16, which is adapted for connection to the heart in known manner, is connected to the sense amplifier 11 via a line 17 and to the pulse generator 12 via a line 18. An indifferent electrode 19 is provided in known manner.

The various components and their interconnections discussed to this point are well known to those familiar with the art. A natural heartbeat sensed between the electrodes 16 and 19 causes the sense amplifier 11 to generate a reset signal which resets the pulse generator 12 and inhibits its generation of a stimulation pulse. Failure to detect a natural heartbeat will result in a stimulating pulse being applied across the electrode 16 and 19 by the pulse generator 12.

As discussed above, typical prior art demand cardiac pacers have employed filters, built-in refractory periods, etc. within the sense amplifier 11 to prevent the inhibiting of the pulse generator 12 in response to undesired signals and extraneous noise. In the apparatus of the present invention such filters and built-in refractory periods can be dispensed with and the sense amplifier allowed to generate a reset signal in response to all sensed signals, including electromagnetic impulses.

Connected between the line 13 and a junction 20 is a resistance 21. The junction 20 is connected to the base electrode 22 of the transistor 23 and to ground by a DC bias resistance 24. A capacitor 25 is connected to the emitter electrode 26 of transistor 23 at grounded junction 27 and to the collector electrode 28 of transistor 23 at a junction 29. The junction 29 is connected to a resistance 30, to a positive terminal 31 of a source of energy such as batteries and to the gate electrode 32 of a field effect transistor (FET) 33. FET 33 is connected as a source follower with its drain electrode 34 connected to a positive terminal 35 of a source of energy such as batteries and its source electrode 36 connected to a junction 37. The junction 37 is grounded through a resistance 38 and connected to a junction 39 through resistance 40 and diodes 41 and 42. The FET 33 has a high input impedance and low output impedance and is employed in the disclosed embodiment for isolation and impedance matching purposes. The diodes 41 and 42 are provided as voltage drop devices to reduce the voltage at the terminal 39.

The terminal 39 is connected to ground via a DC bias resistor 34 and to the base terminal 45 of a transistor 46. The emitter electrode 47 of transistor 46 is grounded while its collector electrode 48 is connected to the positive terminal 49 of a source of energy such as batteries via a resistance 50, to the base electrode 51 of a transistor 52 and to one plate of a capacitor 53. The other plate of capacitor 53 is connected to ground as is emitter electrode 54 of transistor 52. The collector electrode 55 of transistor 52 is connected to the line 15. The resistors 14, 21 and 40 are provided for current limiting as is known to those familiar with the art.

In operation, and assuming that the heart is beating naturally, the QRS complex will be sensed at the electrodes 16 and 19 by sensing the R-wave, for example. The sensed R-wave will cause the sense amplifier 11 to generate a reset signal which will be applied to the pulse generator 12 via line 13, resistor 14 and line 15. This reset signal will inhibit the generation of a stimulating pulse by the pulse generator 12 and will restart its timing circuit to produce a stimulating pulse after a predetermined period of time, 800 milliseconds, for example. The inhibiting of the pulse generator 12 by a reset signal from sense amplifier 11 will continue until such time as no natural heartbeat is detected. The absence of a reset signal applied to pulse generator 12 will allow the pulse generator 12 to complete its timing cycle and apply a stimulating pulse across the output electrodes 16 and 19. The generation of a stimulating pulse by the pulse generator 12 will restart its timing cycle to produce another stimulating pulse after 800 milliseconds, if not inhibited.

Between reset signals on line 13, the capacitor 25 will charge with a time constant determined by the capacitance 25 and resistance 30. For the purposes of the present invention, the time constant of the resistance 30 and capacitance 25 may be established at 400 milliseconds. Assuming no reset signal has appeared on line 13 for 400 milliseconds, the capacitor 25 will be fully charged, the transistors 23 and 52 will be off and the transistor 46 will be on. Upon the appearance of the reset signal on line 13, the transistor 23 will turn on and discharge the capacitor 25. The FET 33 follows the charge on capacitor 25 thus turning off transistor 46. Transistor 52 will turn on in response to the turn-off of transistor 46 with a delay provided by the capacitor 53. This delay will allow the reset signal which caused the discharge of capacitor 25 to reset the pulse generator 12 and inhibit its stimulating pulse while shunting subsequent reset signals on line 15 during the time that transistor 52 is on. The on time of transistor 52 is established by the recharge time of capacitor 25 which is the time constant established by the resistor 30 and capacitor 25. FET 33 will follow the ramp representing the increasing charge on capacitor 25 and, when capacitor 25 is fully charged, will cause the transistor 46 to turn on thus turning off transistor 52.

From the above, it can be seen that the frequency detector of the present invention blocks those reset signals from the pulse generator 12 which are subsequent to any reset signal which discharges the capacitor 25. The discharge of capacitor 25 begins the period of time during which subsequent reset signals will be blocked from the pulse generator 12. This period of time is established by the time constant of resistance 30 and capacitance 25 which constitutes a resettable timing circuitry inasmuch as each reset pulse on line 13 during the 400 millisecond time period will again discharge the capacitor 25. Each discharge of capacitor 25 will restart the time period during which reset signals are shunted from the pulse generator.

The apparatus of the present invention can distinguish between signals having a frequency above and below a predetermined value, approximately 2.5 Hz in the example given, and block any reset signal resulting from those sensed signals having a frequency greater than the predetermined value. Also, the apparatus of the present invention will block a second reset signal following an initial reset signal within a predetermined time, 400 milliseconds in the example given, and prevent that signal from resetting the pulse generator. In this manner, the apparatus of the present invention effectively discriminates between desirable signals and undersirable signals such as P and T waves and extraneous noise, including electromagnetic impulses. In logic terms, the transistor 52 operates as an AND circuit in the sense that a control signal applied to its base serves to pass a signal appearing on line 15 while the transistors 23 and 46, FET 33 and capacitor 53 serve to disable the AND circuit by removing the control signal for a predetermined period of time subsequent to each reset signal, the predetermined period of time being established by the time constant of resistance 30 and capacitor 25. This AND circuit analogy can best be understood by viewing the control signal applied to the base of transistor 52 by the turn on of transistor 46 as an AND enable signal which allows the reset signals on line 15 to pass to the pulse generator 12.

Many modifications and variations of the present invention are possible in the light of the above teachings. For example, the frequency detector of the present invention may be directly connected to an antenna for operating in direct response to electromagnetic impulses as opposed to reset signals generated by the sense amplifier 11 in response to those impulses. This may produce a continuous asynchronous operation in the presence of electromagnetic impulses as opposed to an intermittent asynchronous-demand mode of operation which may result with the preferred embodiment of the single FIGURE. It is therefore to be understood that, within the scope of the appended claims, the invention may be practiced otherwise than as specifically described.

What is claimed is:

1. In a demand cardiac pacer of the type having a resettable pulse generator and having sense amplifier means adapted to be connected to the heart and responsive to heart activity for generating pulse generator reset signals, the improvement which comprises:

means for establishing a first predetermined period of time;

means responsive to said sense amplifier means and connected to said first time period establishing means for initiating the operation of said first time period establishing means on the occurrence of each reset signal;

means operative during said first predetermined period of time for blocking said reset signals from said pulse generator; and means for delaying the operation of said blocking means for a second, shorter predetermined period of time following initiating the operation of said first time period establishing means.

2. The cardiac pacer of claim 1 wherein said blocking means comprises means for shunting said reset signals.

3. The cardiac pacer of claim 2 wherein said shunting means comprises transistor switch means.

4. The cardiac pacer of claim 3 wherein said first time period establishing means comprises resettable timing means.

5. The cardiac pacer of claim 4 wherein said delaying means comprises capacitive timing means.

6. The cardiac pacer of claim 1 wherein said first time period establishing means comprises first capacitive timing means and means for charging said first capacitive timing means in the interval between said reset signals, said initiating means comprising means for discharging said first capacitive timing means in response to said reset signals.

7. The cardiac pacer of claim 6 wherein said blocking means further comprises first switch means for switching from one state to another in response to the discharge of said first capacitive timing means.

8. The cardiac pacer of claim 7 wherein said blocking means further comprises normally-off switch means connecting said sense amplifier to ground and responsive to said first switch means for switching on and shunting said reset signals in response to the switching of said first switch means to said other state.

9. The cardiac pacer of claim 8 wherein said delaying means comprises second capacitive means interconnecting said first and normally-off switch means for delaying the response of said normally-off switch means to the switching of said first switch means to said other state.

10. The cardiac pacer of claim 9 wherein said first and normally-off switch means comprise transistor switch means.

* * * * *